(12) United States Patent
Sakaguchi et al.

(10) Patent No.: US 8,932,110 B2
(45) Date of Patent: Jan. 13, 2015

(54) METHOD OF MANUFACTURING PERPENDICULAR MAGNETIC RECORDING MEDIUM SUBSTRATE AND PERPENDICULAR MAGNETIC RECORDING MEDIUM SUBSTRATE MANUFACTURED BY THE SAME

(75) Inventors: Shoji Sakaguchi, Nagano (JP); Masaoki Miyakoshi, Yamanashi (JP); Jun Natsume, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 13/045,918

(22) Filed: Mar. 11, 2011

(65) Prior Publication Data

US 2012/0009441 A1 Jan. 12, 2012

(30) Foreign Application Priority Data

Jul. 6, 2010 (JP) .................................. 2010-154078

(51) Int. Cl.
*B24B 1/00* (2006.01)
*B24B 37/04* (2012.01)
(Continued)

(52) U.S. Cl.
CPC ............. *B24B 37/044* (2013.01); *B24B 37/013* (2013.01); *B24B 37/245* (2013.01); *C09G 1/02* (2013.01); *C09K 3/1463* (2013.01); *G11B 5/8404* (2013.01)
USPC .............................. 451/41; 451/89; 428/846.2

(58) Field of Classification Search
CPC .... B24B 37/245; B24B 53/013; B24B 37/22; B24B 37/044; C09G 1/02; C09K 3/1409; C09K 3/1463; H01L 21/3212; B24D 3/32; G11B 5/84; G11B 5/8404
USPC .............. 428/846.1, 846.2, 689, 31, 64.1, 68, 428/64.19; 451/36, 41, 57, 60, 63, 5, 56, 451/54, 59, 443, 526, 530; 252/79.1; 216/84, 88, 89; 106/3; 51/307, 308, 51/309; 65/61; 29/90.01, 603.01, 604
See application file for complete search history.

(56) References Cited

U.S. PATENT DOCUMENTS

| | | | |
|---|---|---|---|
| 6,910,951 B2 * | 6/2005 | Balijepalli et al. ............... | 451/56 |
| 2002/0002797 A1 * | 1/2002 | Miyata et al. .................... | 51/308 |

(Continued)

FOREIGN PATENT DOCUMENTS

| JP | 2003-535968 | 12/2003 |
|---|---|---|
| JP | 2004-263074 | 9/2004 |

(Continued)

OTHER PUBLICATIONS

Partial Translation of Japanese Office Action mailed Dec. 3, 2013 in corresponding Japanese Application No. 2010-154078.

*Primary Examiner* — Kevin M. Bernatz
*Assistant Examiner* — Louis Falasco

(57) ABSTRACT

A method of manufacturing a perpendicular magnetic recording medium substrate is capable of reducing the waviness of all wavelength components and a recording medium is capable of reducing contact with a magnetic head to improve the flying stability of the magnetic head. The method includes two polishing operations. The first operation includes polishing a substrate having a Ni—P-based alloy underlayer with a first porous material that includes 0.1 wt % to 25 wt % of alumina, titania, silica, and zirconia abrasive while supplying a first slurry liquid including an organic or inorganic acid and a first abrasive to the underlayer of the substrate. The second operation includes polishing a surface of the underlayer polished in the first polishing with a second porous material while supplying a second slurry liquid including an organic or inorganic acid and a second abrasive with a grain diameter smaller than that of the first abrasive.

15 Claims, 13 Drawing Sheets

(51) Int. Cl.
  *B24B 37/013*   (2012.01)
  *B24B 37/24*    (2012.01)
  *C09G 1/02*     (2006.01)
  *C09K 3/14*     (2006.01)
  *G11B 5/84*     (2006.01)
  *G11B 5/73*         (2006.01)

(56) References Cited

U.S. PATENT DOCUMENTS

| | | | |
|---|---|---|---|
| 2002/0006768 A1* | 1/2002 | Wada et al. | 451/41 |
| 2002/0106980 A1* | 8/2002 | Bruxvoort | 451/59 |
| 2003/0027499 A1* | 2/2003 | Fang et al. | 451/41 |
| 2003/0211275 A1* | 11/2003 | Buitron et al. | 29/90.01 |
| 2005/0113005 A1* | 5/2005 | Woo et al. | 451/56 |
| 2006/0172663 A1* | 8/2006 | Zhang | 451/56 |
| 2006/0175295 A1* | 8/2006 | Chu et al. | 51/308 |
| 2008/0076327 A1* | 3/2008 | Yamaguchi et al. | 51/308 |
| 2009/0130346 A1* | 5/2009 | Osawa et al. | 428/31 |
| 2009/0158775 A1* | 6/2009 | Takizawa et al. | 65/61 |
| 2010/0075577 A1* | 3/2010 | Kojima et al. | 451/41 |

FOREIGN PATENT DOCUMENTS

| | | | |
|---|---|---|---|
| JP | 2005-206866 | 8/2005 | |
| JP | 2007-250166 | 9/2007 | |
| WO | WO 01/98201 A2 | 12/2001 | |
| WO | 2008/058200 | * 5/2008 | B24B 29/02 |

* cited by examiner

METHOD OF MANUFACTURING PERPENDICULAR MAGNETIC RECORDING MEDIUM SUBSTRATE AND PERPENDICULAR MAGNETIC RECORDING MEDIUM SUBSTRATE MANUFACTURED BY THE SAME

CROSS-REFERENCE TO RELATED APPLICATIONS

This application claims the priority benefit of Japanese Patent Application No. 2010-154078, filed on Jul. 6, 2010, in the Japanese Intellectual Property Office, the disclosure of which is incorporated herein by reference.

BACKGROUND

1. Field

The present invention relates to a method of manufacturing a perpendicular magnetic recording medium substrate. In particular, the method is capable of reducing the waviness of all wavelength components. The invention also relates to a magnetic recording medium substrate manufactured by the method.

2. Description of the Related Art

As a technique for improving the recording density of magnetic recording media, a perpendicular magnetic recording method has been put into practical use instead of a longitudinal magnetic recording method according to the related art.

A hard disk device includes a magnetic recording medium (hereinafter, simply referred to as a medium) that can be rotated at a high speed and a magnetic head facing the medium. The magnetic head slightly floats and flies over the medium rotating at high speed, due to the air flow generated by the rotation, thereby writing signals onto the medium or reading signals written on the medium.

In general, the magnetic recording medium is formed by sequentially laminating (1) a non-magnetic metal underlayer, which is a Ni—P plated layer, (2) a Cr underlayer formed by, for example, a sputtering method, (3) a Co alloy magnetic layer, and (4) a protective layer, which is, for example, a carbon layer, on a disk-shaped substrate made of an aluminum-based alloy.

In the hard disk device, the recording density of signals onto the medium greatly depends on the distance (hereinafter, simply referred to as the amount of flying height of the head) between the medium and the magnetic head that flies over the medium. As flying height is reduced, the recording density increases. The surface of the medium needs to be as flat as possible for the magnetic head to stably glide over the medium with a small amount of flying height without contacting the surface of the medium. Since the magnetic layer and the protective layer on the medium are very thin, the surface of the underlayer needs to be flat in order to planarize the surface of the medium. In the manufacture of the magnetic recording medium, after the underlayer is formed, mirror-like finishing (hereinafter, referred to as a polishing or grinding process) is performed on the surface of the underlayer. Polishing is performed as follows: urethane pads are attached to the surfaces of an upper platen and a lower platen; a substrate having an underlayer plated thereon is interposed between the upper and lower platens; and slurry is supplied through a slurry supply hole provided in the upper platen while the upper platen and the lower platen rotate in a designated direction, thereby polishing the surface of the substrate. In general, for example, alumina or silica grains are used as the abrasive grains of the slurry and a polyurethane foam pad is used as a sliding/contact process material.

Japanese Patent Application Laid-Open (JP-A) No. 2007-250166 discloses a method of manufacturing a glass substrate for a magnetic disk which polishes the surface of the glass substrate using a polishing pad, such as a urethane foam pad, while supplying slurry to the glass substrate, thereby preventing the swelling and drooping of the edge of the glass substrate. The slurry includes an abrasive such as cerium oxide or colloidal silica. In the method, the concentration of the abrasive ranges from 25 wt % to 33 wt %, preferably from 27 wt % to 30 wt %, in order to prevent the swelling and drooping of the edge of the glass substrate.

In recent years, there has been a strong demand for increasing the recording density of the hard disk. To meet the demand, the amount of flying height of the head is reduced to, for example, about 5 nm. For the magnetic head to glide stably on the medium with a small flying height of about 5 nm, it is necessary to planarize the surface of the medium. In particular, a magnetic head having a magnetoresistive ("MR") element has been generally used. However, the MR element is weak against heat and is likely to generate an erroneous electric signal due to heat caused by contact with the medium.

There is also the waviness of many wavelength components in the surface of the substrate. In particular, wavelength components of about 20 μm to 1000 μm greatly affect flying height stability for the stable flying of the magnetic head. Therefore, it is necessary to reduce the waviness of the wavelength components and improve the flying height stability of the magnetic head.

SUMMARY

The invention has been made in view of the problems and requirements. An object of the invention is to provide a manufacturing method capable of reducing the waviness of all wavelength components (through the specification, all wavelength components mean 1 μm to 10000 μm) in a short time and a perpendicular magnetic recording medium substrate capable of suppressing contact between a magnetic head and the surface of a magnetic recording medium to improve the flying height stability of the magnetic head while improving the productivity of a magnetic recording medium substrate.

To achieve the object, one aspect of the invention provides a method of manufacturing a perpendicular magnetic recording medium substrate. The method includes: a first polishing step of polishing a substrate having an underlayer made of a Ni—P-based alloy with a first porous material while supplying a first slurry liquid including an organic acid or an inorganic acid and a first abrasive to the underlayer of the substrate; and a second polishing step of polishing a surface of the underlayer polished in the first polishing step with a second porous material while supplying a second slurry liquid including an organic acid or an inorganic acid and a second abrasive with a grain diameter smaller than that of the first abrasive, wherein, an abrasive selected from a group consisting of alumina, titania, silica, and zirconia is added to the first porous material in the amount equal to or more than 0.1 wt % and less than 25 wt % of the weight of the first porous material.

As such, the method includes the first and second polishing steps. It is preferable that the first porous material in the first polishing step be a urethane pad. The first porous material includes at least one abrasive selected from the group consisting of alumina, titania, silica, and zirconia, and polishing is performed with the first porous material while the first slurry liquid including the inorganic acid or the organic acid and the first abrasive is supplied. The grain size of the abrasive included in the first porous material preferably ranges from 5 nm to 500 nm, and more preferably, from 20 nm to 300 nm.

In the above-mentioned aspect of the invention, the substrate subjected to the first and second polishing steps may be polished until the arithmetic average roughness Ra of the surface of the underlayer is equal to or more than 0.02 nm and equal to or less than 0.2 nm.

In the above-mentioned aspect of the invention, in the second polishing step, the surface of the underlayer may be polished until a wavelength waviness Wa of 20 μm to 200 μm in the surface of the underlayer is equal to or less than 0.2 nm, a wavelength waviness Wa of 100 μm to 1000 μm is equal to or less than 0.5 nm, and a wavelength waviness Wa of 500 μm to 2000 μm is equal to or less than 1.0 nm.

According to another aspect of the invention, a perpendicular magnetic recording medium substrate is manufactured by the above-mentioned manufacturing method.

According to a method of manufacturing a perpendicular magnetic recording medium substrate of embodiments of the invention, it is possible to reduce the waviness of all wavelengths.

BRIEF DESCRIPTION OF THE DRAWINGS

These and/or other aspects and advantages will become apparent and more readily appreciated from the following description of embodiments, taken in conjunction with the accompanying drawings of which.

DESCRIPTION OF EMBODIMENTS

Hereinafter, exemplary embodiments of the invention will be described.

Figure 1:
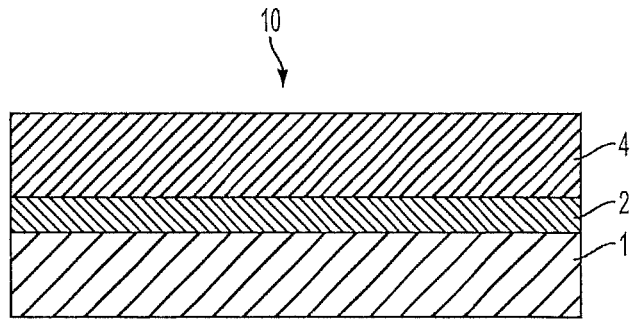
FIG. 1 is a cross-sectional view schematically illustrating a magnetic recording medium substrate according to embodiments of the invention.

First, a perpendicular magnetic recording medium substrate according to embodiments of the invention will be described. FIG. 1 is a cross-sectional view schematically illustrating the preferred structure of the perpendicular magnetic recording medium substrate. The structure is shown as an example of the perpendicular magnetic recording medium substrate, but the perpendicular magnetic recording medium substrate according to embodiments of the invention is not limited to this structure.

A perpendicular magnetic recording medium substrate 10 shown in FIG. 1 has a structure in which a base 1, an initial reaction layer 2, and a non-magnetic underlayer 4 are sequentially formed. A base used in a conventional perpendicular magnetic recording medium substrate is used as the base 1. For example, a base made of an aluminum alloy, tempered glass, or crystallized glass is used as the base 1. A substrate formed of polycarbonate, polyolefin, and other plastic resins by injection molding may also be used as the base 1.

Next, the initial reaction layer 2 will be described.

In general, a Zn layer is used as the initial reaction layer on the base 1 made of an aluminum alloy. For example, the Zn layer can be formed by dipping the base 1 in a zincate solution (a solution including zinc oxide and a sodium hydroxide aqueous solution).

When the base 1 is made of, for example, tempered glass, crystallize glass, or plastic, an activation treatment that sequentially dips the base 1 in, for example, an acidic solution of tin chloride hydrochloric acid and an acidic solution of palladium chloride hydrochloric acid to deposit palladium (Pd) nuclei on the surface of the base 1 is generally used to form the initial reaction layer on the non-conductive base 1. However, for example, Ni, Ni—P, Cu, Cr, Fe, or Pd may be formed on the base 1 by a physical vapor deposition method, such as a sputtering method or an ion plating method.

The non-magnetic underlayer 4, which is a Ni—P layer, is formed on the initial reaction layer 2 by a non-electrolytic plating method.

For mass production at a low manufacturing cost, it is preferable that a Ni—P plated layer be formed on the base 1 by a non-electrolytic plating method. However, the invention is not limited thereto. For example, the non-magnetic underlayer 4 may also be formed by other general deposition methods including physical vapor deposition methods, such as a sputtering method and an ion plating method, according to necessary characteristics.

Next, the surface of the perpendicular magnetic recording medium substrate manufactured in this way is polished by a manufacturing method according to embodiments of the invention.

The manufacturing method according to embodiments of the invention includes: a first polishing process that polishes the substrate including the underlayer made of a Ni—P-based alloy with a first porous material while supplying a first slurry liquid including an organic acid or an inorganic acid and a first abrasive to the underlayer of the substrate; and a second polishing process that polishes the surface of the underlayer polished by the first polishing process with a second porous material while supplying a second slurry liquid including an organic acid or an inorganic acid and a second abrasive with a grain diameter smaller than that of the first abrasive. In the first polishing process, the content of an abrasive for the first porous material selected from a group consisting of alumina, titania, silica, and zirconia in the first porous material is equal to or more than 0.1 wt % and less than 25 wt %.

The first polishing process performs polishing with the first porous material while supplying the first slurry liquid including the organic acid or the inorganic acid and the first abrasive.

Examples of the organic acid used in the first slurry liquid may include a citric acid, a maleic acid, a malic acid, a phosphoric acid, a succinic acid, and a formic acid. In addition, examples of the inorganic acid used in the first slurry liquid may include a phosphoric acid, a nitric acid, a sulfuric acid, a boric acid, and a hydrofluoric acid.

In addition to the organic acid or the inorganic acid, an abrasive is used in the first slurry liquid. For example, alumina, titania, or zirconia may be used as the abrasive of the slurry liquid. It is preferable that the average grain diameter of the abrasive added to the first slurry liquid be in the range of about 0.2 µm to 0.6 µm.

It is preferable that the concentration of the acid included in the slurry liquid ranges from 0.1 wt % to 10.0 wt %. In addition, it is preferable that the pH of the slurry liquid ranges from 1.0 to 4.0. It is preferable that the concentration of the abrasive included in the slurry liquid ranges from 3 wt % to 10 wt % with respect to the total amount of slurry liquid.

The slurry liquid may include an aqueous solution (for example, pure water or deionized water), if necessary.

It is preferable that the first porous material used in the first polishing process be a foam pad such as a urethane foam pad. In embodiments of the invention, the pad includes an abrasive, and the surface of the perpendicular magnetic recording medium substrate is polished while the slurry liquid is supplied. The abrasive included in the first porous material is selected from the group consisting of alumina, titania, silica, and zirconia. The abrasive for a pad is combined with the slurry liquid to obtain a magnetic recording medium substrate with small waviness.

In embodiments of the invention, it is preferable that the concentration of the abrasive for a pad in the pad be equal to or more than 0.1 wt % and less than 25 wt %, and preferably, equal to or more than 3.0 wt % and less than 20 wt %. In addition, the grain diameter of the abrasive for a pad ranges from 5 nm to 500 nm, preferably from 20 nm to 300 nm.

In the first polishing process, polishing pads including the above-mentioned abrasive are attached to an upper platen and a lower platen, and the substrate interposed between the upper platen and the lower platen is polished while the above-mentioned loose grains (first slurry liquid) are supplied. Any known polishing apparatus used to polish the perpendicular magnetic recording medium substrate can be used as a polishing apparatus according to embodiments of the invention. For example, a polishing apparatus manufactured by System Seiko Co., Ltd. may be given as an example of the polishing apparatus.

Then, the substrate polished in the first polishing process is further polished in the second polishing process. The second polishing process polishes the substrate with the second porous material while supplying the second slurry liquid including the organic acid or the inorganic acid and a second abrasive with a grain diameter smaller than that of the first abrasive.

Examples of the organic acid used in the second slurry liquid include a citric acid, a maleic acid, a malic acid, a phosphoric acid, a succinic acid, and a formic acid. Examples of the inorganic acid used in the second slurry liquid include a phosphoric acid, a nitric acid, a sulfuric acid, a boric acid, and a hydrofluoric acid.

Silica abrasive grains may be used as the second abrasive used in the second slurry liquid. The diameter of the abrasive grain is smaller than that of the abrasive grain used in the first slurry liquid. The grain diameter preferably ranges from 10 nm to 50 nm, more preferably from 10 nm to 30 nm. In this way, it is possible to reduce waviness in all wavelength bands.

In the second polishing process, polishing may be performed with the second porous material, for example, a urethane foam pad manufactured by Fujibo Holdings Inc. In the second polishing process, it is not necessary to mix an abrasive with the second porous material.

In the second polishing process, similar to the first polishing process, polishing pads are attached to the upper platen and the lower platen, and the substrate interposed between the upper platen and the lower platen is polished while loose grains (second slurry liquid) are supplied. The polishing apparatus used in the second polishing process is the same as that in the first polishing process.

It is preferable that the concentration of the acid included in the second slurry liquid ranges from 0.1 wt % to 10.0 wt %. In addition, it is preferable that pH of the second slurry liquid ranges from 1.0 to 4.0. It is preferable that the concentration of the abrasive included in the second slurry liquid ranges from 3.0 wt % to 10.0 wt % with respect to the total amount of slurry liquid. The second slurry liquid may include an aqueous solution (for example, pure water or deionized water), if necessary.

For example, polishing conditions in the first polishing process and the second polishing process are as follows:
(a) First Polishing Process
The number of revolutions of the upper platen: 12 rpm
The number of revolutions of the lower platen: −18 rpm Polishing rate: 0.4 μm/minute
Polishing time: 300 sec
Supply rate of slurry liquid: 0.5 liter/minute; and
(b) Second polishing process
Pad pressing force during polishing: 100 g/cm$^2$
The number of revolutions of the upper platen: 12 rpm
The number of revolutions of the lower platen: −18 rpm
Polishing rate: 0.1 μm/minute
Polishing time: 400 sec
Supply rate of slurry liquid: 0.5 liter/minute.

In the manufacturing method according to embodiments of the invention, it is preferable that the second polishing process polish the substrate until the arithmetic average roughness Ra of the surface of the underlayer is equal to or more than 0.02 nm and equal to or less than 0.2 nm.

The surface roughness Ra is arithmetic average roughness. The arithmetic average roughness means average roughness (Ra) calculated from the measurement range of one measuring operation (in the case of AFM, for example, 256 or 512 substrates are scanned in the range of 10 μm×10 μm). The average roughness Ra is obtained by measuring the surface roughness at a plurality of points and averaging the values.

In the manufacturing method according to embodiments of the invention, it is preferable that the second polishing process polish the substrate until a wavelength waviness Wa of 20 μm to 200 μm in the surface of the underlayer is equal to or less than 0.2 nm, a wavelength waviness Wa of 100 μm to 1000 μm is equal to or less than 0.5 nm, and a wavelength waviness Wa of 500 μm to 2000 μm is equal to or less than 1.0 nm.

In the manufacturing method according to embodiments of the invention, it is possible to improve the flying height stability of a magnetic head of a magnetic disk device by achieving the above-mentioned surface roughness Ra and the above-mentioned waviness Wa in each wavelength band.

The surface roughness Ra is measured in an area of 10 μm×10 μm by an atomic force microscope (AFM) (Digital Instruments Nanoscope 5). The waviness Wa of the substrate surface is measured by setting an object lens of New View 6300 manufactured by ZYGO Corporation to a magnifying power of 10 and inputting a designated wavelength value to a filter wavelength unit.

Detailed measurement conditions, such as the value of the wavelength, are as follows:
Magnifying power of object lens: 10; and
When a wavelength of 100 μm to 1000 μm is measured,
Filter low wavelength: 100 μm, and
Filter high wavelength: 1000 μm.

Next, a magnetic recording medium can be manufactured using the perpendicular magnetic recording medium substrate obtained in this way. According to an embodiment of the magnetic recording medium obtained by a method of manufacturing a magnetic recording medium according to embodiments of the invention, a non-magnetic underlayer, a stabilizing layer, a spacer layer, a magnetic layer, a protective layer, and a liquid lubricant layer may be sequentially formed on the surface obtained by polishing the Ni—P layer. When the surface of the Ni—P layer is polished, the non-magnetic underlayer, the stabilizing layer, the spacer layer, the magnetic layer, the protective layer, and the liquid lubricant layer may be sequentially formed on the surface subjected to the process according to embodiments of the invention. In addition, the non-magnetic underlayer, the stabilizing layer, the spacer layer, the magnetic layer, the protective layer, and the liquid lubricant layer may be sequentially formed on the surface subjected to texture processing, if necessary.

The non-magnetic underlayer is formed in order to control the crystallinity or crystal axis direction of a magnetic layer to be formed on the underlayer. When the thickness of the underlayer is reduced to decrease the grain size of the underlayer, it is possible to also reduce the magnetic grain size of the magnetic layer formed on the underlayer. The number of underlayers may be one or more. It is preferable that the underlayer be a non-magnetic film made of chrome (Cr), an alloy obtained by adding at least one of molybdenum (Mo), tungsten (W), titanium (Ti), vanadium (V), and manganese (Mn) to chrome (Cr), which is a main component, or a mixture thereof. In addition, it is preferable that the material forming the underlayer have a crystal lattice close to the crystal lattice of the magnetic layer and the material forming the underlayer be appropriately selected according to the composition of the magnetic layer. It is preferable that the thickness of the underlayer 4 be equal to or more than 4 nm and equal to or less than 10 nm in terms of small medium noise and a high SNR. When the thickness of the underlayer is greater than 10 nm, the magnetic grain size increases and the effect of reducing medium noise is reduced. When the thickness of the underlayer is less than 4 nm, the medium noise increases due to an increase in the relative grain diameter dispersion of the magnetic grains. The thickness of the underlayer is more preferably equal to or more than 5 nm and equal to or less than 10 nm, and most preferably, equal to or more than 5 nm and equal to or less than 8 nm. The underlayer may be formed by a known method, such as a DC sputtering method or an electron beam evaporation method.

The magnetic recording medium has the stabilizing layer between the underlayer and the magnetic layer. The stabilizing layer is formed in order to generate anti-ferromagnetic coupling between the magnetic layer and the stabilizing layer. It is preferable that the stabilizing layer and the spacer layer to be formed on the stabilizing layer form a pair.

The strength of the generated anti-ferromagnetic coupling depends on various factors, such as the compositions, thicknesses, and deposition conditions (for example, pressure and atmosphere) of the stabilizing layer, the spacer layer, and the magnetic layer, and the flatness of each layer. Only one pair of the stabilizing layer and the spacer layer may be provided, or the number of pairs of the stabilizing layer and the spacer layer may increase as long as the anti-ferromagnetic coupling is generated between the magnetic layer and the stabilizing layer.

It is preferable that the stabilizing layer be a magnetic film made of an alloy obtained by adding at least one of chrome (Cr), tantalum (Ta), platinum (Pt), boron (B), and copper (Cu) to cobalt (Co), which is a main component, or a mixture thereof. Specifically, examples of the alloy include CoCr, CoCrTa, CoCrPt, and CoCrPtTa. As described above, since the strength of the anti-ferromagnetic coupling depends on, for example, the thickness and composition of the stabilizing layer, the thickness and composition of the stabilizing layer may be selected such that stronger anti-ferromagnetic coupling is obtained. In particular, the thickness of the stabilizing layer is preferably equal to or more than 2 nm and equal to or less than 15 nm, and more preferably, equal to or more than 4 nm and equal to or less than 12 nm in order to obtain stronger anti-ferromagnetic coupling. In addition, it is preferable that the remanent magnetization of the stabilizing layer is less than that of the magnetic layer and the holding force of the stabilizing layer be less than the coercivity of the magnetic layer. The reason is that, since the magnetization direction of the stabilizing layer changes depending on the magnetization direction of the magnetic layer, the magnetization of the magnetic layer needs to be more stable than that of the stabilizing layer. The magnitude of the remanent magnetization of the stabilizing layer and the magnetic layer depends on, for example, the composition, thickness, and deposition conditions of the layers, but is not particularly limited in the magnetic recording medium according to embodiments of the invention. The stabilizing layer may be formed by a known method, such as a DC sputtering method and an electron beam evaporation method.

It is preferable that the spacer layer be a non-magnetic film made of ruthenium (Ru), rhenium (Re), or osmium (Os), an alloy including at least one of them, or a mixture thereof. As described above, since the strength of the anti-ferromagnetic coupling changes depending on, for example, the thickness and composition of the spacer layer, the thickness and composition of the spacer layer may be selected such that stronger anti-ferromagnetic coupling is obtained. The thickness of the spacer layer is preferably equal to or more than 0.5 nm and equal to or less than 1.2 nm, and more preferably, equal to or more than 0.7 nm and equal to or less than 0.9 nm in order to obtain stronger anti-ferromagnetic coupling. It is preferable that the crystal structure of the spacer layer be a hexagonal crystal structure. In this case, since the stabilizing layer and the magnetic layer made of an alloy including Co as a main component have a hexagonal crystal structure, it is possible to accelerate continuous crystal growth of these layers and the spacer layer and thus reduce medium noise. The spacer layer may be formed by a known method, such as a DC sputtering method and an electron beam evaporation method.

The magnetic layer is a layer for recording and reproducing information (magnetic recording layer). It is preferable that the magnetic layer be a magnetic film made of an alloy obtained by adding at least one of chrome (Cr), tantalum (Ta), platinum (Pt), boron (B), and copper (Cu) to cobalt (Co), which is a main component, or a mixture thereof. Examples of the alloy include CoCr, CoCrTa, CoCrPt, and CoCrPtTa. As described above, it is preferable that the remanent magnetization of the stabilizing layer is less than that of the magnetic layer and the holding force of the stabilizing layer be less than the coercivity of the magnetic layer. As described above, since the strength of the anti-ferromagnetic coupling changes depending on, for example, the thickness and composition of the magnetic layer, the thickness and composition of the magnetic layer may be selected such that stronger anti-ferromagnetic coupling is obtained. The magnetic layer may be formed by a known method, such as a DC sputtering method or an electron beam evaporation method.

In the magnetic recording medium according to embodiments of the invention, it is preferable that a protective layer be provided on the magnetic layer. The protective layer is provided in order to protect the magnetic layer from, for example, the impact of the head and corrosion due to an external corrosive material. The protective layer may be made of any material capable of providing this function, but the material is not particularly limited. Specifically, it is preferable that the protective film be made of, for example, carbon, nitrogen-containing carbon, or hydrogen-containing carbon. The thickness of the protective layer is typically equal to or less than 10 nm, and the number of protective layers may be one or more. The protective layer may be formed by, for example, a sputtering method, a CVD method, or an FCA method.

It is preferable that a liquid lubricant layer be provided on the protective layer. The liquid lubricant layer is formed in order to prevent the crash of the head. The lubricant layer may be made of, for example, an organic material represented by HO—$CH_2$—$CF_2$—($CF_2$—O)$_m$—($C_2F_4$—O)$_n$—$CF_2$—$CH_2$—OH (wherein n+m is about 40). It is preferable that the thickness of the liquid lubricant layer is set to a value capable of fulfilling the function of the liquid lubricant layer considering, for example, the quality of the protective layer. The liquid lubricant layer may be formed by a known coating method.

In the magnetic recording medium according to embodiments of the invention, arbitrary layers may be provided by arbitrary methods for the purpose of the recording medium. For example, a non-magnetic metal seed layer may be additionally provided below the underlayer to control the orientation of the magnetic layer, reduce the grain size, or reduce the grain diameter dispersion. In addition, a metal magnetic intermediate layer that does not affect the functions of the spacer layer and the stabilizing layer may be formed between the underlayer and the magnetic layer for crystallographic consistency of the magnetic layer.

EXAMPLES

Embodiments of the invention will be described in detail below.

Example 1

A first porous material used in Example 1 is a urethane foam pad. A urethane foam pad in which about 3% of alumina abrasive grains with an average grain diameter of 0.3 μm were mixed was used in the first polishing process.

As another polishing pad, a urethane foam pad in which about 3% of alumina abrasive grains with an average grain diameter of 0.1 μm or about 3% of alumina abrasive grains with an average grain diameter of 0.05 μm were mixed was used. That is, three kinds of urethane foam pads including 3 wt % of three kinds of alumina abrasive grains with different average grain diameters were used.

In addition, as a comparative example of the first polishing process, a substrate was polished with a conventional urethane foam pad without any abrasive grain.

A Zn layer was formed as an initial reaction layer on a base made of an aluminum alloy by dipping the base in a zincate solution (solution including a zinc oxide and a sodium hydroxide aqueous solution). A non-magnetic underlayer, which was a Ni—P layer, was formed on the initial reaction layer by a non-electrolytic plating method, thereby forming a substrate.

In the first polishing process, polishing was performed using a slurry liquid (the concentration of acid: 1.5 w %; and the concentration of alumina abrasive grains: 4 wt %), which was a mixture of an inorganic acid (material: inorganic phosphoric acid) and alumina abrasive grains with an average grain diameter of 0.3 μm as loose grains while changing the polishing time.

Polishing conditions of first polishing process:
Pad pressing force during polishing: 90 g/cm$^2$
The number of revolutions of upper platen: 12 rpm
The number of revolutions of lower platen: −18 rpm
Polishing rate: 0.4 μm/minute
Supply rate of slurry liquid: 0.5 liter/minute Then, in the second polishing process, polishing was performed using a slurry liquid (the concentration of acid: 1 w %; and the concentration of silica abrasive grains: 5 wt %), which was a mixture of an inorganic acid (material: phosphoric acid) and silica abrasive grains with an average grain diameter of 20 nm as loose grains.

Polishing was performed using a conventional urethane foam pad without any abrasive grain as the polishing pad while changing the polishing time.

Polishing conditions of second polishing process:
Pad pressing force during polishing: 100 g/cm$^2$
The number of revolutions of upper platen: 12 rpm
The number of revolutions of lower platen: −18 rpm
Polishing rate: 0.1 μm/minute
Supply rate of slurry liquid: 0.5 liter/minute The polishing result is shown in FIGS. 2 to 6.

Figure 2:
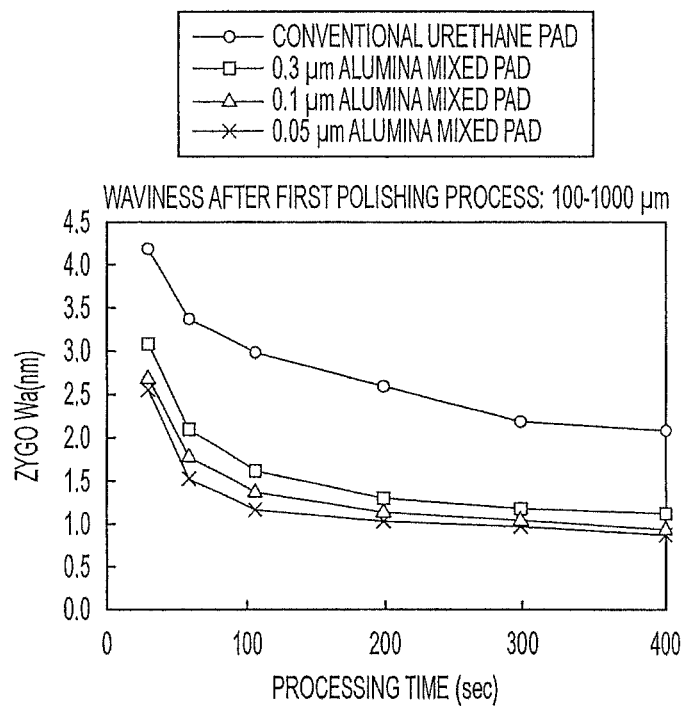
FIG. 2 is a graph illustrating the result of the waviness Wa (wavelength: 100 μm to 1000 μm) of the surface of a substrate measured by New View 6300 manufactured by ZYGO Corporation at the time when a first process ends in Example 1.
Figure 3:
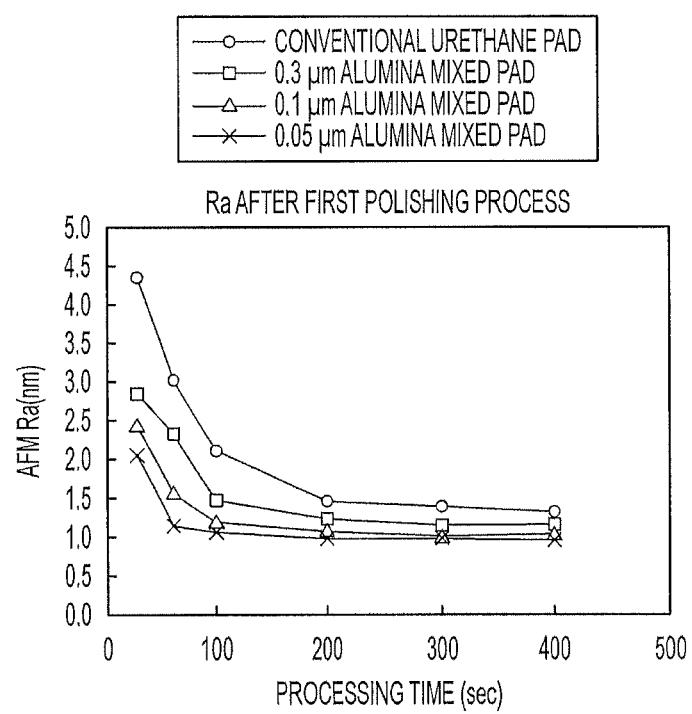
FIG. 3 is a graph illustrating the result of the surface roughness Ra of the surface of the substrate measured in an area of 10 μm×10 μm by an atomic force microscope (AFM) (trade name: Nanoscope 5, manufactured by Digital Instruments, Inc.) at the time when the first process ends in Example 1.

FIG. 2 is a graph illustrating the result of the waviness Wa (wavelength: 100 μm to 1000 μm) of the substrate surface measured by New View 6300 manufactured by ZYGO Corporation at the time when the first polishing process ends, and FIG. 3 is a graph illustrating the result of the surface roughness Ra measured in an area of 10 μm×10 μm by an atomic force microscope (AFM) (Nanoscope 5 manufactured by Digital Instruments, Inc.) under the same conditions.

In the case of a conventional urethane pad, as the polishing time increases, waviness tends to be gradually reduced. However, in the case of a pad having abrasive grains mixed therewith, waviness is reduced in a short time. In addition, as the diameter of the abrasive grain to be mixed is reduced, waviness is reduced.

For the measurement of the surface roughness Ra by AFM, in the case of a conventional urethane foam pad, as the polishing time increases, roughness tends to be gradually reduced. However, in the case of a pad having abrasive grains mixed therewith, roughness is reduced in a short time. In addition, as the diameter of the abrasive grain to be mixed is reduced, surface roughness tends to be reduced.

Figure 4:
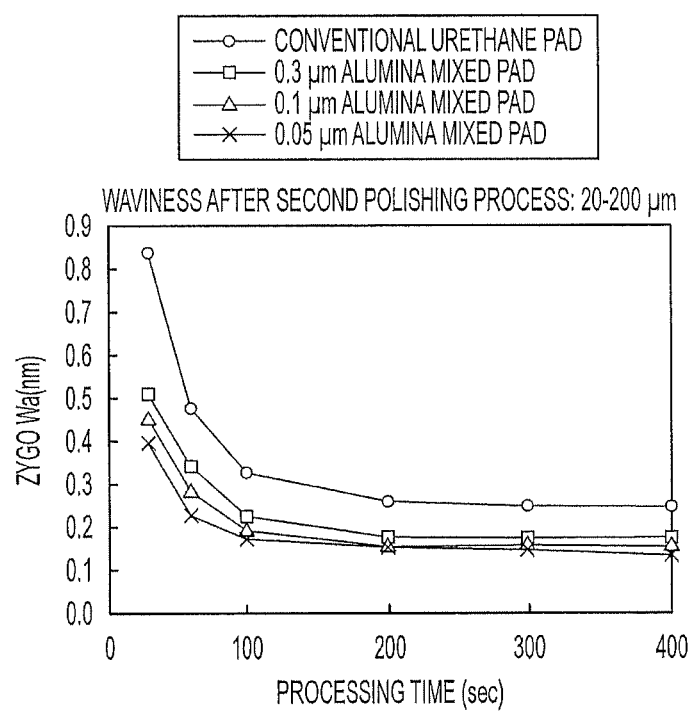
FIG. 4 is a graph illustrating the result of the waviness Wa (wavelength: 20 μm to 200 μm) of the surface of the substrate measured by New View 6300 manufactured by ZYGO Corporation at the time when the second process ends in Example 1.

FIG. 4 is a graph illustrating the waviness Wa (20 μm to 200 μm) of the substrate surface measured by the above-mentioned measuring device manufactured by ZYGO Corporation at the time when the second polishing process ends.

Figure 5:
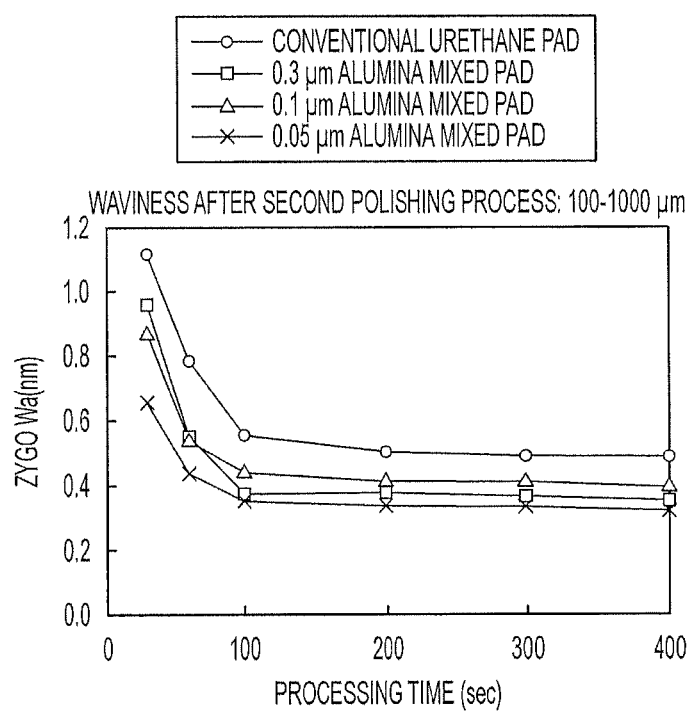
FIG. 5 is a graph illustrating the result of the waviness Wa (wavelength: 100 μm to 1000 μm) of the surface of the substrate measured by the above-mentioned measuring device manufactured by ZYGO Corporation at the time when a second process ends in Example 1.

FIG. 5 is a graph illustrating the waviness Wa (100 μm to 1000 μm) of the substrate surface measured by the above-mentioned measuring device manufactured by ZYGO Corporation at the time when the second polishing process ends.

Figure 6:
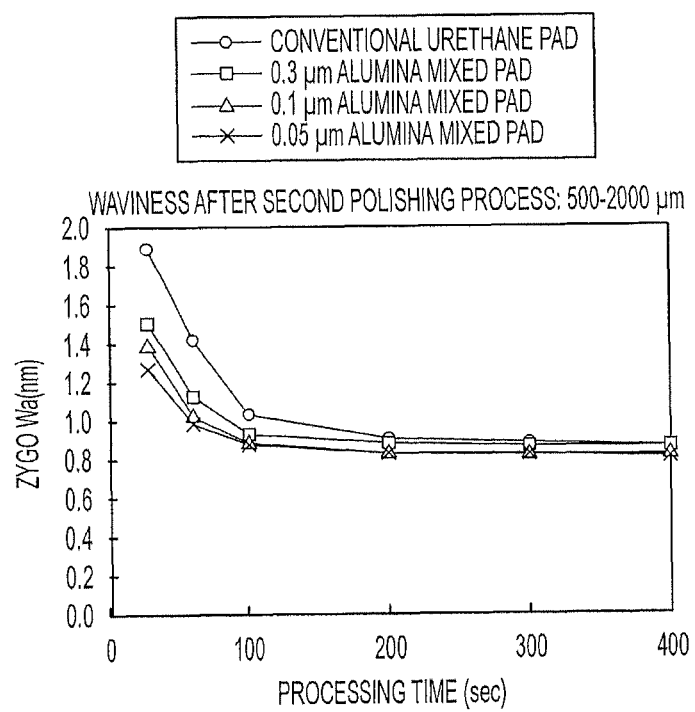
FIG. 6 is a graph illustrating the result of the waviness Wa (wavelength: 500 μm to 2000 μm) of the surface of the substrate measured by New View 6300 manufactured by ZYGO Corporation at the time when the second process ends in Example 1.

FIG. 6 is a graph illustrating the waviness Wa (500 μm to 2000 μm) of the substrate surface measured by the above-mentioned measuring device manufactured by ZYGO Corporation at the time when the second polishing process ends.

Similar to the tendency when the first polishing process ends, in the case of a conventional urethane pad, as the processing time increases, waviness tends to be gradually reduced. However, in the case of a pad having abrasive grains mixed therewith, waviness is reduced in a short time. In addition, as the diameter of the abrasive grain to be mixed is reduced, waviness tends to be reduced.

Example 2

A first porous material used in Example 2 is a urethane foam pad. A urethane foam pad in which about 10% of alumina abrasive grains with an average grain diameter of 0.3 μm were mixed was used in the first polishing process.

As another polishing pad, a urethane foam pad in which about 10% of alumina abrasive grains with an average grain diameter of 0.1 μm or about 10% of alumina abrasive grains with an average grain diameter of 0.05 μm were mixed was used. That is, three kinds of urethane foam pads including 10 wt % of three kinds of alumina abrasive grains with different average grain diameters were used.

In addition, as a comparative example of the first polishing process, a substrate was polished with a conventional urethane foam pad without any abrasive grain.

A Zn layer was formed as an initial reaction layer on a base made of an aluminum alloy by dipping the base in a zincate solution (solution including a zinc oxide and a sodium hydroxide aqueous solution). A non-magnetic underlayer, which was a Ni—P layer, was formed on the initial reaction layer by a non-electrolytic plating method, thereby forming a substrate.

In the first polishing process, polishing was performed using a slurry liquid (the concentration of acid: 1.5 w %; and the concentration of alumina abrasive grains: 4 wt %), which was a mixture of an organic acid (material: organic phosphoric acid) and alumina abrasive grains with an average grain diameter of 0.3 μm as loose grains.

Polishing conditions of first polishing process:
Pad pressing force during polishing: 90 g/cm$^2$
The number of revolutions of upper platen: 12 rpm
The number of revolutions of lower platen: −18 rpm
Polishing rate: 0.4 μm/minute
Supply rate of slurry liquid: 0.5 liter/minute Then, in the second polishing process, polishing was performed using a slurry liquid (the concentration of acid: 1 w %; and the concentration of silica abrasive grains: 5 wt %), which was a mixture of an inorganic acid (material: phosphoric acid) and silica abrasive grains with an average grain diameter of 20 nm as loose grains.

Polishing was performed using a conventional urethane foam pad without any abrasive grain as the polishing pad while changing the polishing time.

Polishing conditions of second polishing process:
Pad pressing force during polishing: 100 g/cm$^2$
The number of revolutions of upper platen: 12 rpm
The number of revolutions of lower platen: −18 rpm
Polishing rate: 0.1 μm/minute
Supply rate of slurry liquid: 0.5 liter/minute The polishing result is shown in FIGS. 7 and 8.

Figure 7:
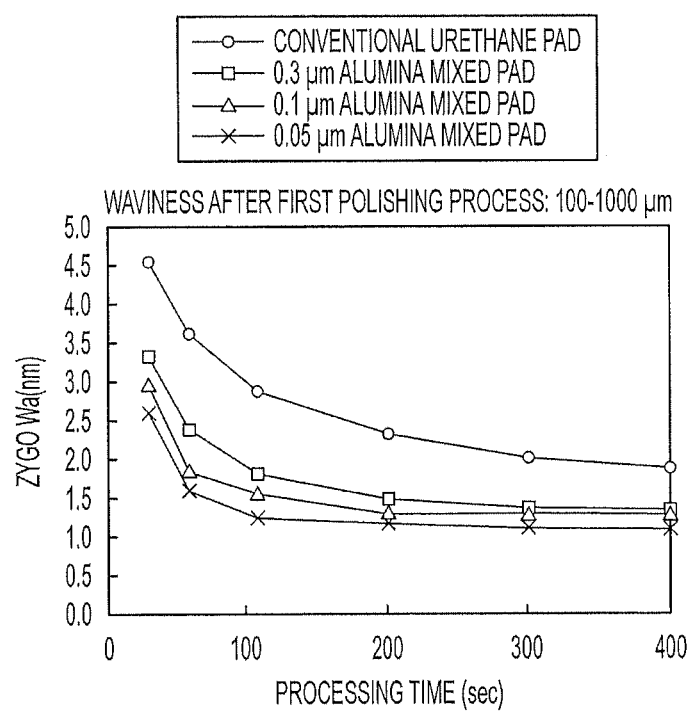
FIG. 7 is a graph illustrating the result of the waviness Wa (wavelength: 100 μm to 1000 μm) of the surface of a substrate measured by New View 6300 manufactured by ZYGO Corporation at the time when a first process ends in Example 2.
Figure 8:
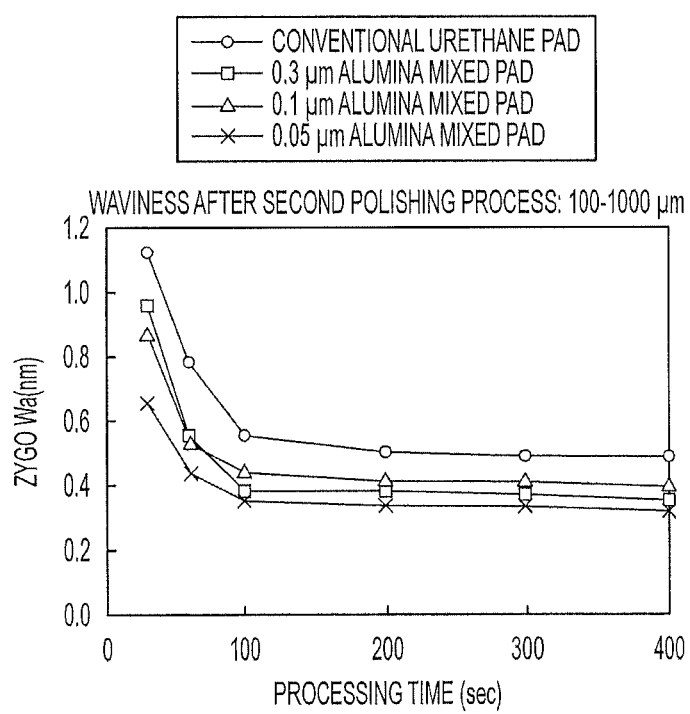
FIG. 8 is a graph illustrating the result of the waviness Wa (wavelength: 100 μm to 1000 μm) of the surface of the substrate measured by New View 6300 manufactured by ZYGO Corporation at the time when a second process ends in Example 2.

FIG. 7 is a graph illustrating the result of the waviness Wa (wavelength: 100 μm to 1000 μm) of the substrate surface measured by the above-mentioned measuring device manufactured by ZYGO Corporation at the time when the first polishing process ends, and FIG. 8 is a graph illustrating the result of the waviness Wa (wavelength: 100 μm to 1000 μm) of the substrate surface measured by the above-mentioned measuring device manufactured by ZYGO Corporation at the time when the second polishing process ends.

The measurement result shows that, even when the concentration of the abrasive grains is 10 wt %, waviness is reduced in a short time. In addition, as the diameter of the abrasive grain to be mixed is reduced, waviness is reduced.

The measurement result shows that, even when the second polishing process ends, there is the same tendency as that when the first polishing process ends and waviness is reduced in a short time. In addition, as the diameter of the abrasive grain to be mixed is reduced, waviness is reduced.

Example 3

A first porous material used in Example 3 is a urethane foam pad. A urethane foam pad in which about 20 wt % of alumina abrasive grains with an average grain diameter of 0.3 μM were mixed was used in the first polishing process.

As another polishing pad, a urethane foam pad in which about 20 wt % of alumina abrasive grains with an average grain diameter of 0.1 μm or about 20 wt % of alumina abrasive grains with an average grain diameter of 0.05 μm were mixed was used. That is, three kinds of urethane foam pads including 20 wt % of three kinds of alumina abrasive grains with different average grain diameters were used.

In addition, as a comparative example of the first polishing process, a substrate was polished with a conventional urethane foam pad without any abrasive grain.

A Zn layer was formed as an initial reaction layer on a base made of an aluminum alloy by dipping the base in a zincate solution (solution including a zinc oxide and a sodium hydroxide aqueous solution). A non-magnetic underlayer, which was a Ni—P layer, was formed on the initial reaction layer by a non-electrolytic plating method, thereby forming a substrate.

In the first polishing process, polishing was performed using a slurry liquid (the concentration of acid: 1.5 w %; and the concentration of alumina abrasive grains: 4 wt %), which was a mixture of an organic acid (material: organic phosphoric acid) and alumina abrasive grains with an average grain diameter of 0.3 μm as loose grains.

Polishing conditions of first polishing process:
Pad pressing force during polishing: 90 g/cm$^2$
The number of revolutions of upper platen: 12 rpm
The number of revolutions of lower platen: −18 rpm
Polishing rate: 0.4 μm/minute
Supply rate of slurry liquid: 0.5 liter/minute Then, in the second polishing process, polishing was performed using a slurry liquid (the concentration of acid: 1 w %; and the concentration of silica abrasive grains: 5 wt %), which was a mixture of an inorganic acid (material: phosphoric acid) and silica abrasive grains with an average grain diameter of 20 nm as loose grains.

Polishing was performed using a conventional urethane foam pad without any abrasive grain as the polishing pad while changing the polishing time.

Polishing conditions of second polishing process:
Pad pressing force during polishing: 100 g/cm$^2$
The number of revolutions of upper platen: 12 rpm
The number of revolutions of lower platen: −18 rpm
Polishing rate: 0.1 μm/minute
Supply rate of slurry liquid: 0.5 liter/minute The polishing result is shown in FIGS. 9 and 10.

Figure 9:
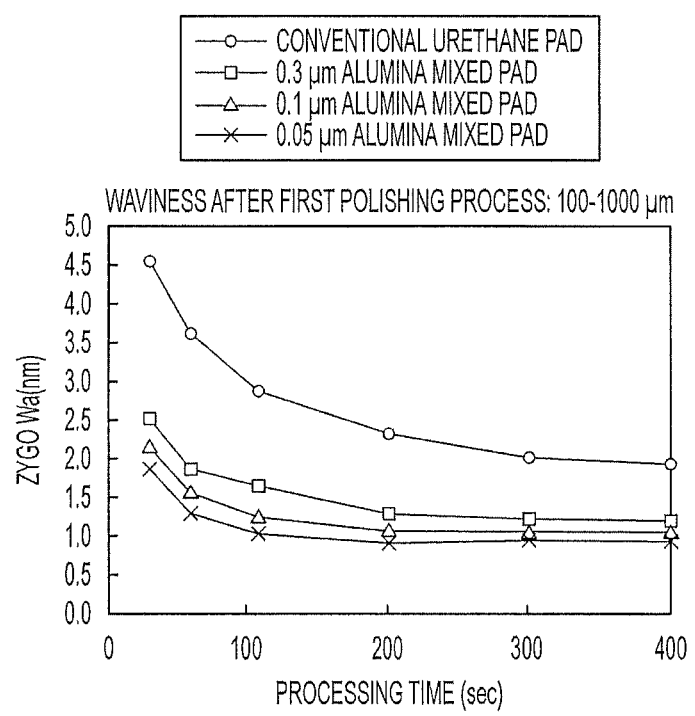
FIG. 9 is a graph illustrating the result of the waviness Wa (wavelength: 100 μm to 1000 μm) of the surface of a substrate measured by New View 6300 manufactured by ZYGO Corporation at the time when a first process ends in Example 3.
Figure 10:
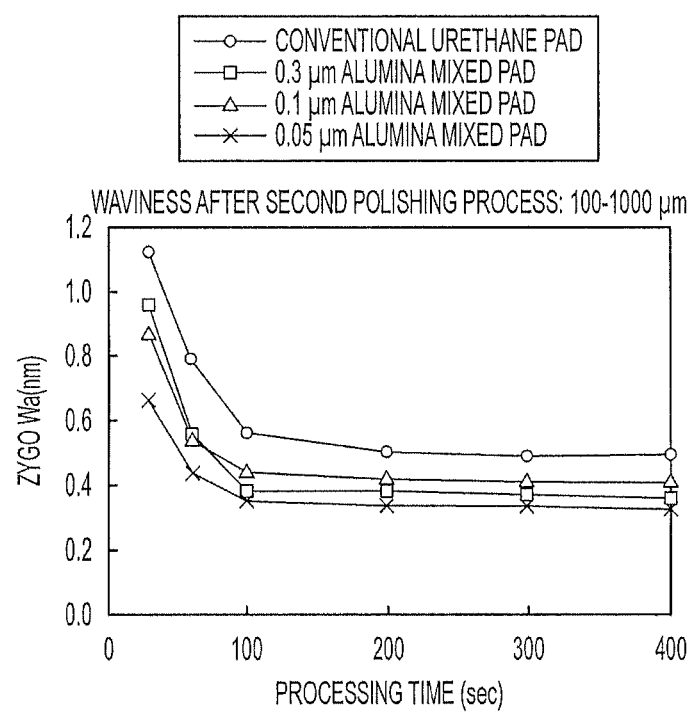
FIG. 10 is a graph illustrating the result of the waviness Wa (wavelength: 100 μm to 1000 μm) of the surface of the substrate measured by New View 6300 manufactured by ZYGO Corporation at the time when a second process ends in Example 3.

FIG. 9 is a graph illustrating the result of the waviness Wa (wavelength: 100 μm to 1000 μm) of the substrate surface measured by the above-mentioned measuring device manufactured by ZYGO Corporation at the time when the first polishing process ends, and FIG. 10 is a graph illustrating the result of the waviness Wa (wavelength: 100 μm to 1000 μm) of the substrate surface measured by the above-mentioned measuring device manufactured by ZYGO Corporation at the time when the second polishing process ends.

The measurement result shows that, even when the concentration of the abrasive grains is 20 wt %, waviness is reduced in a short time. In addition, as the diameter of the abrasive grain to be mixed is reduced, waviness is reduced.

The measurement result shows that, even when the second polishing process ends, there is the same tendency as that when the first polishing process ends and waviness is reduced in a short time. In addition, as the diameter of the abrasive grain to be mixed is reduced, waviness is reduced.

Comparative Example 1

A first porous material used in Comparative example 1 is a urethane foam pad. A urethane foam pad in which about 30 wt % of alumina abrasive grains with an average grain diameter of 0.3 μm were mixed was used in the first polishing process.

As another polishing pad, a urethane foam pad in which about 30 wt % of alumina abrasive grains with an average grain diameter of 0.1 μm or about 30 wt % of alumina abrasive grains with an average grain diameter of 0.05 μm were mixed was used. That is, three kinds of urethane foam pads including 30 wt % of three kinds of alumina abrasive grains with different average grain diameters were used.

In addition, for comparison with the first polishing process, a substrate was polished with a conventional urethane foam pad without any abrasive grain.

A Zn layer was formed as an initial reaction layer on a base made of an aluminum alloy by dipping the base in a zincate solution (solution including a zinc oxide and a sodium hydroxide aqueous solution). A non-magnetic underlayer, which was a Ni—P layer, was formed on the initial reaction layer by a non-electrolytic plating method, thereby forming a substrate.

In the first polishing process, polishing was performed using a slurry liquid (the concentration of acid: 1.5 wt %; and the concentration of alumina abrasive grains: 4 wt %), which was a mixture of an organic acid (material: organic phosphoric acid) and alumina abrasive grains with an average grain diameter of 0.3 μm as loose grains.

Polishing conditions of first polishing process:
Pad pressing force during polishing: 90 g/cm$^2$
The number of revolutions of upper platen: 12 rpm
The number of revolutions of lower platen: −18 rpm
Polishing rate: 0.4 μm/minute
Supply rate of slurry liquid: 0.5 liter/minute Then, in the second polishing process, polishing was performed using a slurry liquid (the concentration of acid: 1 w %; and the concentration of silica abrasive grains: 5 wt %), which was a mixture of an inorganic acid (material: phosphoric acid) and silica abrasive grains with an average grain diameter of 20 nm as loose grains.

Polishing was performed using a conventional urethane foam pad without any abrasive grain as the polishing pad while changing the polishing time.

Polishing conditions of second polishing process:
Pad pressing force during polishing: 100 g/cm$^2$
The number of revolutions of upper platen: 12 rpm
The number of revolutions of lower platen: −18 rpm
Polishing rate: 0.1 μm/minute
Supply rate of slurry liquid: 0.5 liter/minute The polishing result is shown in FIGS. 11 and 12.

Figure 11:
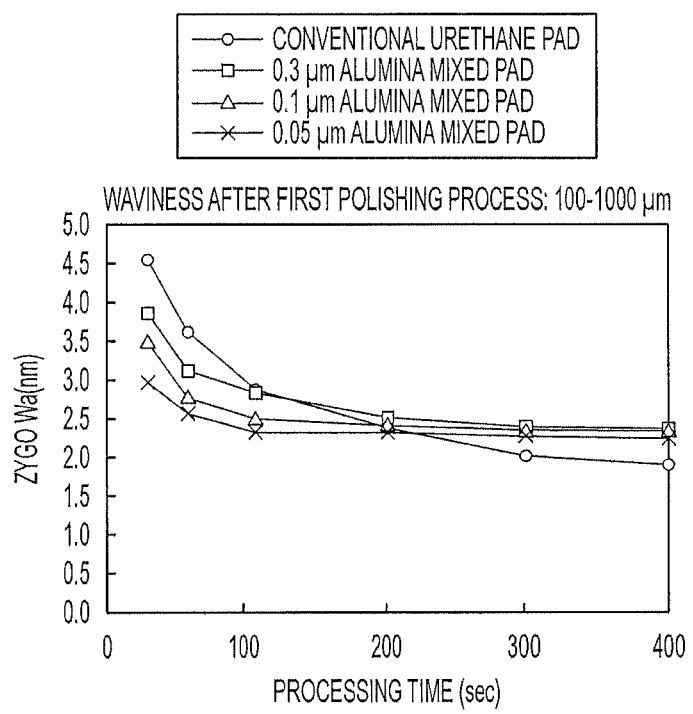
FIG. 11 is a graph illustrating the result of the waviness Wa (wavelength: 100 μm to 1000 μm) of the surface of a substrate measured by New View 6300 manufactured by ZYGO Corporation at the time when a first process ends in Comparative example 1.
Figure 12:
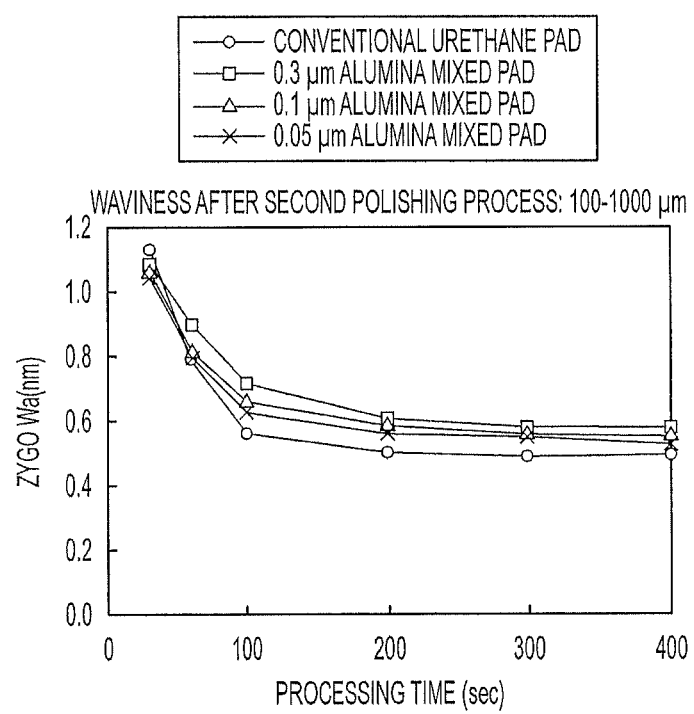
FIG. 12 is a graph illustrating the result of the waviness Wa (wavelength: 100 μm to 1000 μm) of the surface of the substrate measured by New View 6300 manufactured by ZYGO Corporation at the time when a second process ends in Comparative example 1.

FIG. 11 is a graph illustrating the result of the waviness Wa (wavelength: 100 μm to 1000 μm) of the substrate surface measured by the above-mentioned measuring device manufactured by ZYGO Corporation at the time when the first polishing process ends, and FIG. 12 is a graph illustrating the result of the waviness Wa (wavelength: 100 μm to 1000 μm) of the substrate surface measured by the above-mentioned measuring device manufactured by ZYGO Corporation at the time when the second polishing process ends.

As in Comparative example 1, when the concentration of the abrasive grains mixed with the urethane foam pad is high, waviness tends to be worse than that when a pad without any abrasive grain is used, and it is difficult to reduce waviness in a short time even after the second polishing process ends.

Figure 13:
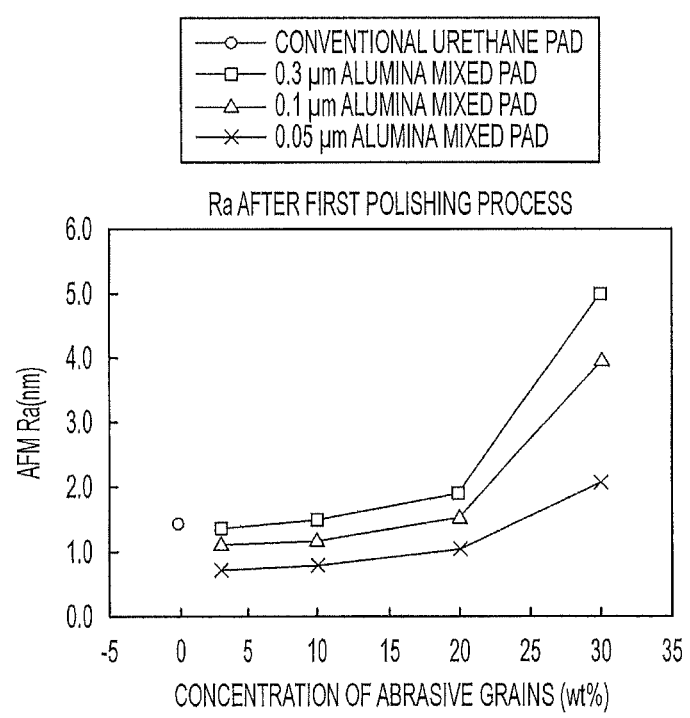
FIG. 13 is a graph illustrating the comparison between the average roughnesses Ra of the substrates measured by AFM with respect to the concentration of the abrasive grains used, after the first process ends in Example 1, Example 2, Example 3, and Comparative example 1.
Figure 14:
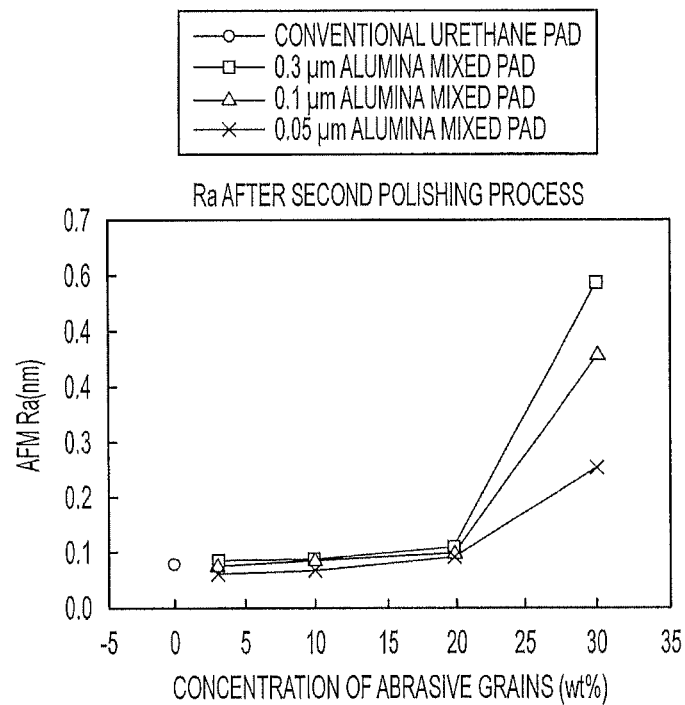
FIG. 14 is a graph illustrating the comparison between the average roughnesses Ra of the substrates measured by AFM with respect to the concentration of the abrasive grains used, after the second process ends in Example 1, Example 2, Example 3, and Comparative example 1.

FIG. 13 is a graph illustrating the comparison between the average roughnesses Ra of the substrates measured by AFM with respect to the concentration of the abrasive grains used, after the first polishing process ends in Example 1, Example 2, Example 3, and Comparative example 1, and FIG. 14 is a graph illustrating the comparison between the average roughnesses Ra of the substrates measured by AFM with respect to the concentration of the abrasive grains used, after the second polishing process ends in Example 1, Example 2, Example 3, and Comparative example 1.

The graph of FIG. 13 shows that, when the concentration of the abrasive grains mixed with the first urethane foam pad is 30 wt % (Comparative example 1), the average roughness Ra measured by AFM is excessively high.

The graph of FIG. 14 shows that, when the concentration of the abrasive grains mixed with the first urethane foam pad is 30 wt % (Comparative example 1), the average roughness Ra of the substrate subjected to the second polishing process measured by AFM is also excessively high.

Figure 15:
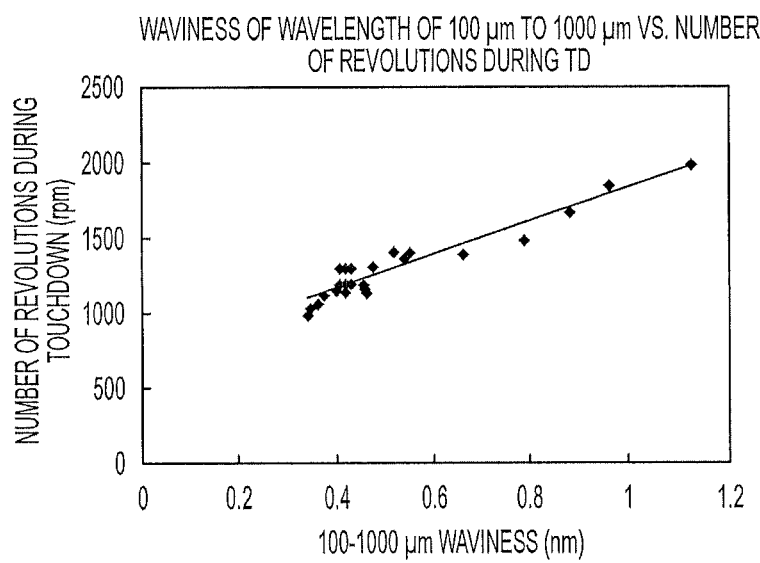
FIG. 15 is a graph illustrating the relationship between the waviness Wa (wavelength: 100 μm to 1000 μm) of the surface of the substrate and the flying characteristics (the number of revolutions of the medium when touchdown ("TD") occurred) of a magnetic recording medium.

FIG. 15 is a graph illustrating the relationship between the value of the waviness Wa (wavelength: 100 µm to 1000 µm) measured by the measuring device manufactured by ZYGO Corporation at the time when the second polishing process ends and the flying characteristics of the actual magnetic head (the number of revolutions when touchdown occurred). The flying characteristics of the magnetic head were measured with a magnetic recording medium using the substrate subjected to the second polishing process. The magnetic recording medium was manufactured with the substrate subjected to the second polishing process by a manufacturing process described in the method of manufacturing the magnetic recording medium.

The flying characteristics of the magnetic head were measured by, for example, the following method. A tester (RQ7800) manufactured by Hitachi DECO Company was used, a 30% slider head for testing the glide height manufactured by Hitachi Metals, Ltd. was used, the number of revolutions of the disk was gradually reduced with the head flying, the number of revolutions where the head and the disk contact each other to generate a signal was plotted, and the relationship between the waviness of the substrate surface and the number of revolutions was checked.

The graph of FIG. 15 shows that, as the value of the waviness Wa (wavelength: 100 µm to 1000 µm) measured by the measuring device manufactured by ZYGO Corporation at the time when the second polishing process ends is reduced, the number of revolutions when touchdown occurred is reduced, which results in a good flying performance.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of manufacturing a perpendicular magnetic recording medium substrate, comprising:
    first polishing a surface of an underlayer made of a Ni—P-based alloy with a first porous material, having an abrasive mixed in the first porous material prior to the first polishing in an amount that is in a range of from 3 wt % to 20 wt % of the weight of the first porous material, while supplying a first slurry liquid including an organic acid or an inorganic acid and a first further abrasive to the underlayer, the underlayer being of a substrate, and the abrasive mixed in the first porous material prior to the first polishing being an abrasive selected from a group consisting of alumina, titania, silica, and zirconia, and having an average grain diameter ranging from 5 nm to 300 nm and smaller than that of the first further abrasive; and
    second polishing the surface of the underlayer polished in the first polishing with a second porous material while supplying a second slurry liquid including an organic acid or an inorganic acid and a second further abrasive with an average grain diameter smaller than that of the first further abrasive.

2. The method of manufacturing a perpendicular magnetic recording medium substrate according to claim 1, wherein, in the second polishing, the substrate is polished until the arithmetic average roughness Ra of the surface of the underlayer is equal to or more than 0.02 nm and equal to or less than 0.2 nm.

3. The method of manufacturing a perpendicular magnetic recording medium substrate according to claim 1, wherein, in the second polishing, the surface of the underlayer is polished until a wavelength waviness Wa of 20 µm to 200 µm in the surface of the underlayer is equal to or less than 0.2 nm, a wavelength waviness Wa of 100 µm to 1000 µm is equal to or less than 0.5 nm, and a wavelength waviness Wa of 500 µm to 2000 µm is equal to or less than 1.0 nm.

4. The method of manufacturing a perpendicular magnetic recording medium substrate according to claim 1, wherein the first porous material is a urethane pad in which the abrasive for the porous material is mixed.

5. The method of manufacturing a perpendicular magnetic recording medium substrate according to claim 4, wherein the average grain diameter of abrasive mixed in the urethane pad prior to the first polishing is at least 5 nm.

6. The method of manufacturing a perpendicular magnetic recording medium substrate according to claim 1, wherein
    a concentration of an acid in the first slurry liquid ranges from 0.1 wt % to 10.0 wt %; and
    a concentration of an acid in the second slurry liquid ranges from 0.1 wt % to 10.0 wt %.

7. The method of manufacturing a perpendicular magnetic recording medium substrate according to claim 1, wherein
    a pH of the first slurry liquid ranges from 1.0 to 4.0; and
    a pH of the second slurry liquid ranges from 1.0 to 4.0.

8. A method of manufacturing a perpendicular magnetic recording medium substrate, comprising:
    first polishing a surface of an underlayer made of a Ni—P-based alloy with a first porous material, having an abrasive mixed in the first porous material prior to the first polishing in an amount at least equal to 0.1 wt % and less than 10 wt % of the weight of the first porous material, while supplying a first slurry liquid including an organic acid or an inorganic acid and a first further abrasive to the underlayer, the underlayer being of a substrate, the first further abrasive having an average grain diameter in a range of from about 0.2 µm to 0.6 µm, and the abrasive mixed in the first porous material prior to the first polishing being an abrasive selected from a group consisting of alumina, titania, silica, and zirconia, and having an average grain diameter ranging from 5 nm to 100 nm; and
    second polishing the surface of the underlayer polished in the first polishing with a second porous material while supplying a second slurry liquid including an organic acid or an inorganic acid and a second further abrasive with an average grain diameter smaller than that of the first abrasive.

9. The method of manufacturing a perpendicular magnetic recording medium substrate according to claim 1, wherein the abrasive mixed in the first porous material prior to the first polishing is in an amount equal to or less than 10 wt % of the weight of the first porous material and the average grain diameter of the abrasive mixed in the first porous material prior to the first polishing is equal to or less than 100 nm.

10. The method of manufacturing a perpendicular magnetic recording medium substrate according to claim 9, wherein
    the second further abrasive has an average grain diameter in a range of from 10 nm to 50 nm.

11. The method of manufacturing a perpendicular magnetic recording medium substrate according to claim 10, wherein
a concentration of an acid in the first slurry liquid ranges from 0.1 wt % to 10.0 wt %;
a concentration of an acid in the second slurry liquid ranges from 0.1 wt % to 10.0 wt %;
a pH of the first slurry liquid ranges from 1.0 to 4.0; and
a pH of the second slurry liquid ranges from 1.0 to 4.0.

12. The method of manufacturing a perpendicular magnetic recording medium substrate according to claim 1, wherein the second slurry includes an organic acid that is a citric acid, a maleic acid, a malic acid, a phosphoric acid, a succinic acid, or a formic acid.

13. A method of manufacturing a perpendicular magnetic recording medium substrate, comprising:
first polishing a surface of an underlayer made of a Ni—P-based alloy with a first porous material, having an abrasive mixed in the first porous material prior to the first polishing in an amount at least equal to 0.1 wt % and less than 10 wt % of the weight of the first porous material, while supplying a first slurry liquid including an organic acid or an inorganic acid and a first further abrasive to the underlayer, the underlayer being of a substrate, and the abrasive mixed in the first porous material prior to the first polishing being an abrasive selected from a group consisting of alumina, titania, silica, and zirconia, and having an average grain diameter equal to or less than 100 nm and smaller than that of the first further abrasive; and
second polishing the surface of the underlayer polished in the first polishing with a second porous material while supplying a second slurry liquid including an organic acid or an inorganic acid and a second further abrasive with an average grain diameter smaller than that of the first further abrasive.

14. The method of manufacturing a perpendicular magnetic recording medium substrate according to claim 13, wherein
the second further abrasive has an average grain diameter in a range of from 10 nm to 50 nm.

15. The method of manufacturing a perpendicular magnetic recording medium substrate according to claim 14, wherein
a concentration of an acid in the first slurry liquid ranges from 0.1 wt % to 10.0 wt %;
a concentration of an acid in the second slurry liquid ranges from 0.1 wt % to 10.0 wt %;
a pH of the first slurry liquid ranges from 1.0 to 4.0; and
a pH of the second slurry liquid ranges from 1.0 to 4.0.

* * * * *